(12) United States Patent
Willins et al.

(10) Patent No.: US 7,596,388 B2
(45) Date of Patent: Sep. 29, 2009

(54) SECTORIZED WIRELESS COMMUNICATION NETWORK OPERATING UNDER 802.11 SPECIFICATIONS

(75) Inventors: Bruce A. Willins, East Northport, NY (US); Jacob Sharony, Dix Hills, NY (US)

(73) Assignee: Symbol Technologies Inc, Holtsville, NY (US)

( * ) Notice: Subject to any disclaimer, the term of this patent is extended or adjusted under 35 U.S.C. 154(b) by 395 days.

(21) Appl. No.: 11/068,510

(22) Filed: Feb. 28, 2005

(65) Prior Publication Data
US 2006/0194616 A1  Aug. 31, 2006

(51) Int. Cl.
*H04M 1/00* (2006.01)
(52) U.S. Cl. .................................. 455/562.1; 455/63.4
(58) Field of Classification Search .................. 455/73, 455/550.1, 561, 562.1, 403, 422.1, 63.4
See application file for complete search history.

(56) References Cited

U.S. PATENT DOCUMENTS

| | | | | |
|---|---|---|---|---|
| 5,295,153 A | * | 3/1994 | Gudmundson | 370/335 |
| 5,539,925 A | * | 7/1996 | Yli-Kotila et al. | 340/7.36 |
| 5,999,818 A | * | 12/1999 | Gilbert et al. | 455/448 |
| 6,188,903 B1 | * | 2/2001 | Gardner et al. | 455/447 |
| 6,754,504 B1 | * | 6/2004 | Reed | 455/517 |
| 6,907,229 B2 | * | 6/2005 | Shpak | 455/69 |
| 7,299,072 B2 | * | 11/2007 | Ninomiya | 455/562.1 |
| 2004/0259558 A1 | | 12/2004 | Skafidas et al. | |

FOREIGN PATENT DOCUMENTS

WO    WO03/026221 A1    3/2003

OTHER PUBLICATIONS

International Search Report for PCT/US2006/006880.
Written Opinion of ISR for PCT/US2006/006880.

* cited by examiner

*Primary Examiner*—Lincoln Donovan
*Assistant Examiner*—David S Luo

(57) ABSTRACT

Methods and systems are provided to facilitate communication with a plurality of remote units in a communication area that includes a plurality of spatial sectors. The system includes a network controller configured to receive and transmit under IEEE 802.11 specifications, and a plurality of directional antennas coupled to the network base station. Each of directional antennas functions as an access point for a respective spatial sector. The directional antennas and the network controller are combined as a single base station apparatus in an exemplary embodiment. Further, an exemplary network controller is configured to concurrently transmit a plurality of the data frames to more than one of the spatial sectors, and to synchronize the transmissions in a manner whereby all of the concurrently transmitted frames end simultaneously.

12 Claims, 4 Drawing Sheets

SECTORIZED WIRELESS COMMUNICATION NETWORK OPERATING UNDER 802.11 SPECIFICATIONS

TECHNICAL FIELD

The present invention generally relates to wireless communication networks, and more particularly relates to wireless networks operating under 802.11 specifications in relatively large communication areas.

BACKGROUND

An IEEE 802.11 network refers to a family of specifications developed for wireless LAN technology, and specifies an over-the-air interface between two wireless units, or between a wireless unit and a base station. Networks that include a base station to facilitate communication with and between a plurality of wireless units are increasingly being used in outdoor wireless environments. Sometimes a high number of units and/or a large communication area necessitate distribution of multiple access points about the area in which the wireless units are to be used. FIG. 1 illustrates four access points 102 distributed about an area 100 in which communication is enabled for one or more wireless units. The access points 102 have overlapping transmitting radii 104, and each access point 102 is wired to a central communication facility 106.

Rather than distribute access points about a communication area, it is desirable to have a single, centrally located access point with an extended transmission radius that covers the entire communication area. Advantages of such a simplified network would include easier device management and reduced costs associated with hardware and outdoor cabling.

Implementing a large communication area network with a single access point would also impart several challenges. To start, increases in the access point transmitting power are constrained by regional regulatory requirements. Further, such increases tend to create asymmetric links since the mobile devices in the communication area may receive transmissions from the access point, but have limited transmitting power for responding to the access point.

One way to overcome some of the problems associated with increasing the access point transmitting power would be to increase the ability of the mobile device antennae to focus transmissions toward the access point. However, an implicit effect of antenna gain is a degree of directivity, and focused transmissions in particular directions can effectively partition the overall communication space. Additional access points may be necessary if the communication space is partitioned due to antenna gain, and to some extent this would defeat the advantages that the single access point may have initially provided. For example, multiple centrally located access points in a partitioned communication area could present a number of difficulties such as reduced system capacity due to transmission collisions and inter-sector roaming overheads using 802.11 network protocols.

Accordingly, it is desirable to provide a wireless communication network that operates under 802.11 specifications and covers a relatively large communication area. In addition, it is desirable for symmetry to exist in the communication links between the mobile units and a base station in such a communication network without implementing a plurality of access points. Furthermore, other desirable features and characteristics of the present invention will become apparent from the subsequent detailed description and the appended claims, taken in conjunction with the accompanying drawings and the foregoing technical field and background.

BRIEF SUMMARY

A wireless network system is provided to facilitate communication with a plurality of remote units in a communication area that includes a plurality of spatial sectors. The system includes a network controller configured to receive and transmit under IEEE 802.11 specifications, and a plurality of directional antennas coupled to the network base station. Each of directional antennas functions as an access point for a respective spatial sector. The directional antennas and the network controller are combined as a single base station apparatus in an exemplary embodiment. Further, an exemplary network controller is configured to concurrently transmit a plurality of the data frames to more than one of the spatial sectors, and to synchronize the transmissions in a manner whereby all of the concurrently transmitted frames end simultaneously.

A method is also provided to facilitating communication with a plurality of remote units in a communication area that includes a plurality of spatial sectors. The method includes the step of receiving and transmitting between the remote units and a network controller under IEEE 802.11 specifications using a plurality of directional antennas that are coupled to the network controller, each directional antenna functioning as an access point for a respective spatial sector. An exemplary method further includes the steps of concurrently transmitting a plurality of the data frames to more than one of the spatial sectors, and synchronizing the concurrent transmissions in a manner whereby all of the frames end simultaneously.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention includes a centrally located base station that coordinates transmission sectors in a communication area, and thereby increases the communication area size and the system capacity. To facilitate and coordinate sectorization, the base station employs a plurality of directional antennas to collocate transmissions between remote units and the base station. Carrier sense information for each sector is shared to prevent collisions between a transmission from a base station sector, and an omnidirectional transmission from a remote unit in a neighboring sector. Further, to increase the system capacity while avoiding interference, transmission frames from the base station to the plurality of sectors are queued in order to synchronize their transmission times. The configuration consequently allows users to cover large communication areas from a single 802.11 network base station without compromising performance and without creating a need to increase mobile unit RF power.

Figure 1:
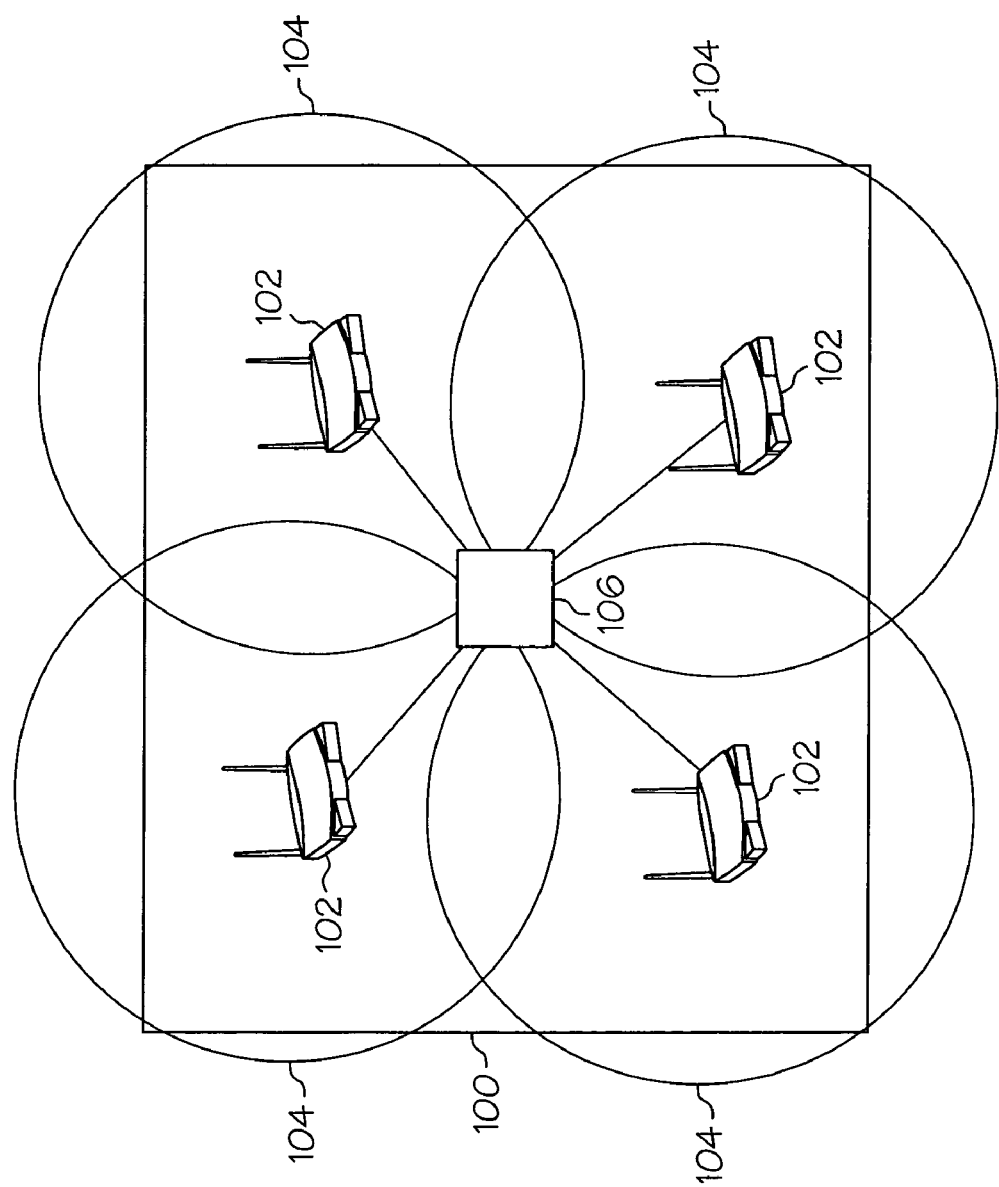
FIG. 1 illustrates a known wireless network protocol in which four access points distributed about a communication area and wired to a central communication facility, the access points having overlapping transmitting radii.
Figure 2:
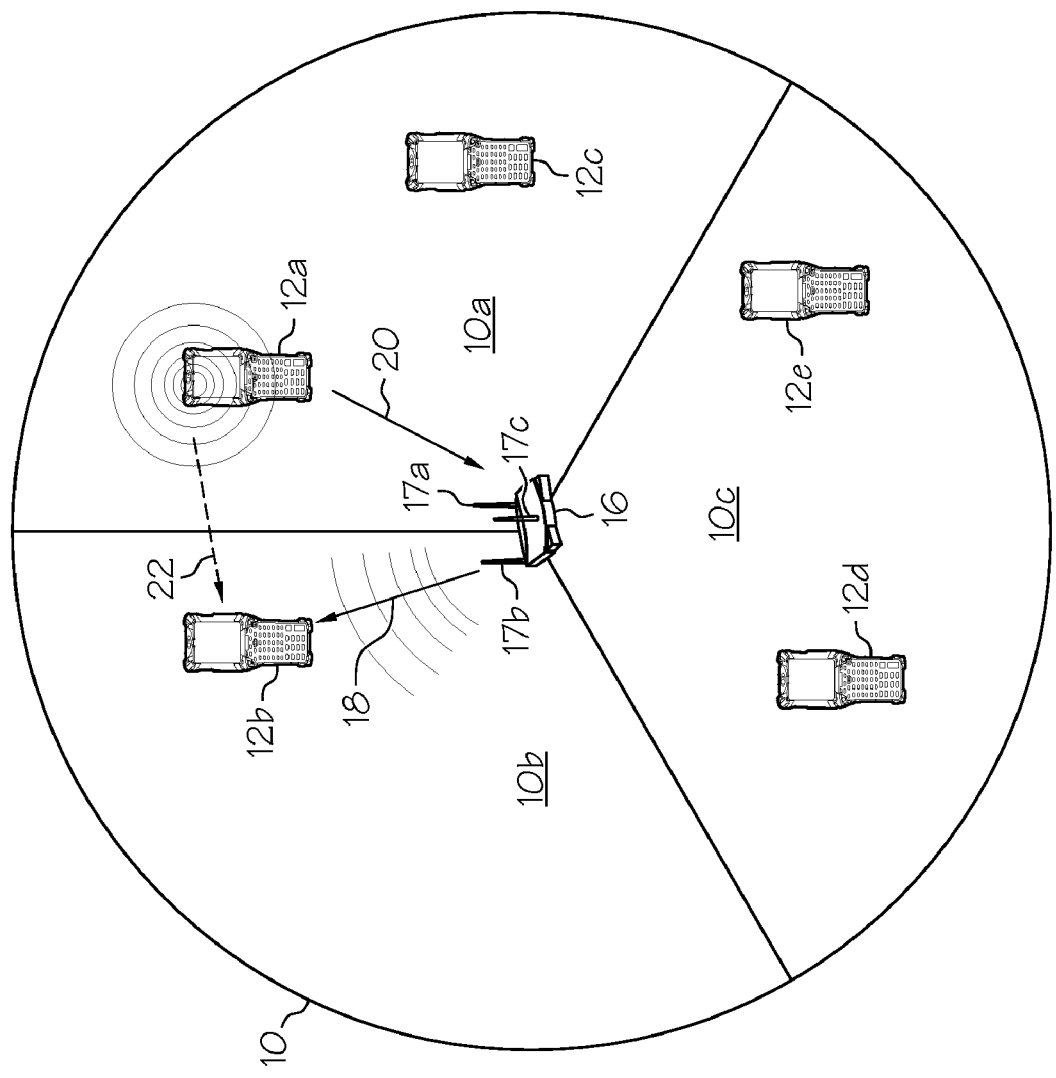
FIG. 2 illustrates an exemplary network configuration in which a base station is positioned inside a sectorized communication area using a plurality of directional antennas.

FIG. 2 illustrates a base station 16 positioned inside a sectorized communication area 10. The base station 16 includes, among other things, a network controller coupled to send and receive transmissions using a plurality of directional antennas. The communication area 10 in the embodiment of FIG. 2 has three spatial sectors 10a, 10b, 10c, although the number of sectors is not limited to three but is dependent on the number of directional antennas included with the base station 16. Since the base station 16 illustrated in FIG. 2 has three directional antennas 17a-17c, the communication area is divided into three sectors 10a-10c. Also, the illustrated embodiment has the three sectors 10a-10c divided equally for efficiency even though the size of each sector can be modified as needed.

Remote wireless units 12a-12e are distributed about the communication area 10, and each unit communicates with the base station 16 using one of a plurality of directional antennas 17a-17c that are coupled to a the base station 16. The remote units 12a-12e may be mobile or stationary, although mobile units will be primarily discussed in the hereafter-described embodiments. In an exemplary configuration the mobile units 12a-12c transmit and receive data frames by communicating with whichever directional antenna is configured to transmit in a direction that is closest to a given unit. For example, units 12a and 12c are situated in sector 10a and communicate with the base station 16 using the closest directional antenna 17a. Likewise, unit 12b is situated in sector 10b and communicates with the base station 16 using directional antenna 17b, and units 12d and 12e are in sector 10c and communicate with the base station 16 using directional antenna 17c. If one of the mobile devices, such as mobile unit 12a, is initially situated in sector 10a but is thereafter received with a higher receive signal strength indication (RSSI) in sector 10c, then future transmissions to the mobile unit 12a will be sent from directional antenna 17c.

Although the centralized base station 16 in the embodiment illustrated in FIG. 2 is a single apparatus that includes a plurality of directional antennas, the base station 16 can also be multiple tightly coupled devices, each having at least one directional antenna. In either case, the directional antennas 17a-17c and base station are combined as a centrally located, centralized device. Further, the remote units 12a-12e can either be mobile or stationary units. In an exemplary embodiment each of the sectors use the same frequency channel, which allows each of the antennas 17a-17c to share a common basic service set identifier (BSSID). Alternatively, different frequency channels can be used in each sector, although this requires the remote units 12a-12e to frequently scan while roaming between sectors, if the remote units are mobile, and potentially inhibits the use of nearby 802.11 cells on alternative channels. If each of the sectors use the same frequency channel, and also share a common basic BSSID, one or more of the directional antennas 17a-17c may often receive the same frame. However, using the centralized base station 16 only one of the directional antennas 17a-17c will forward the frame, or in other words, the centralized base station 16 will only forward one copy of the frame for transmission using a selected directional antenna.

Each of the antennas 17a-17c in FIG. 2 provides a significant amount of functionality to the base station 16 by operating as a virtual access point for its respective sector. Since each of the antennas 17a-17c has its transmitting and receiving power focused on a sector instead of an entire radius about the base station 16, the combined antennas 17a-17c produce a communication area that has an extended radius. By using antenna gain instead of increased transmitting power to obtain the extended communication radius, the links between the base station 16 and the mobile units 12a-12e are symmetric. Further, using antenna gain enables use of mobile units 12a-12e with relatively low, but constant, transmitting power throughout the communication area 10.

Although the communication area 10 is sectorized through the use of the directional antennas 17a-17c, there are still some situations in which interference can be created from simultaneous transmissions between the mobile units 12a-12e. One such situation is illustrated in FIG. 2 between the base station 16 and two mobile units 12a and 12b that are in different sectors but are relatively close to each other. Arrow 18 indicates that the base station is transmitting to mobile unit 12b using the antenna 17b that corresponds to the communication area sector 10b. Arrow 20 indicates that at the same time, the mobile unit 12a in communication sector 10a is transmitting to the base station through the corresponding antenna 17a. However, the mobile units transmit in all directions, and the transmission from the mobile unit 12a in sector 10a interferes with the transmission from the base station to the mobile unit 12b in sector 10b, as indicated by arrow 22. Even if all three sectors are on the same channel, the mobile unit 12a in sector 10a is unable to carrier sense on the transmission from the base station antenna 17b in sector 10b. Similarly, the base station antenna 17b in sector 10b is unable to carrier sense on the transmission from the mobile unit 12a in sector 10a. The directional nature of the base station transmissions creates "hidden" nodes that reduce capacity, and further creates an increased probability that transmission collisions will occur throughout the communication area 10.

To overcome the potential for transmission collisions, the base station device or coupled devices in an exemplary network configuration share carrier sense information in real time. For example, if the mobile unit 12a in sector 10a begins transmitting before the base station 16 begins transmitting to the mobile unit 12b in sector 10b using the corresponding directional antenna 17b, the base station 16 receives the transmission from the mobile unit 12a and asserts carrier sense, thereby holding off transmission to the mobile unit 12b using the directional antenna 17b. By holding off the transmission using the directional antenna 17b, the base station 16 avoids any potential transmission collisions. In another exemplary network configuration, the base station can prevent transmission collisions between the transmissions from the mobile unit 12a and the base station directional antenna 17a by, upon receiving the transmission from the mobile unit 12a, transmitting from the directional antennas 17b and 17c a ready-to-send (RTS)/clear-to-send (CTS) signal with a sufficiently long network allocation vector.

Figure 3:
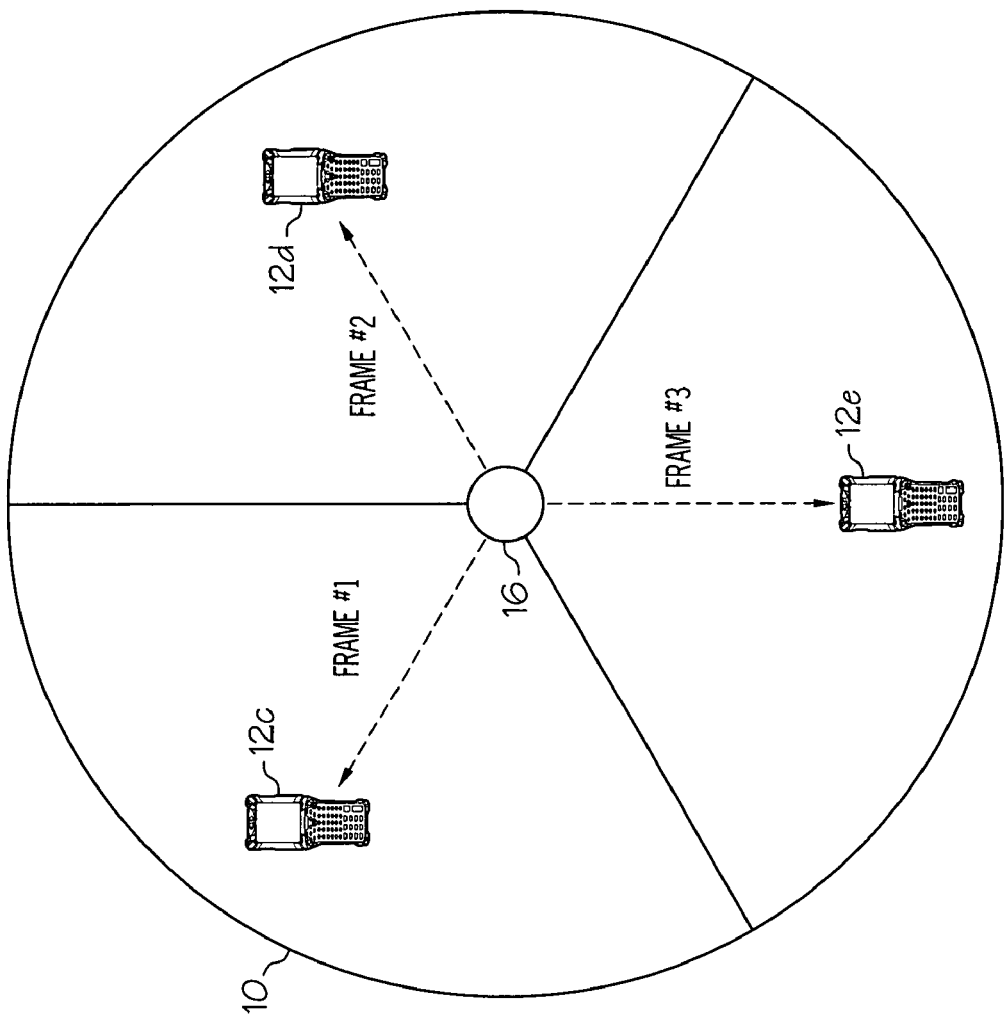
FIG. 3 illustrates another exemplary network configuration in which a base station is positioned inside a sectorized communication area using a plurality of directional antennas, and synchronized frames are transmitted to mobile devices in different communication area sectors.
Figure 4:
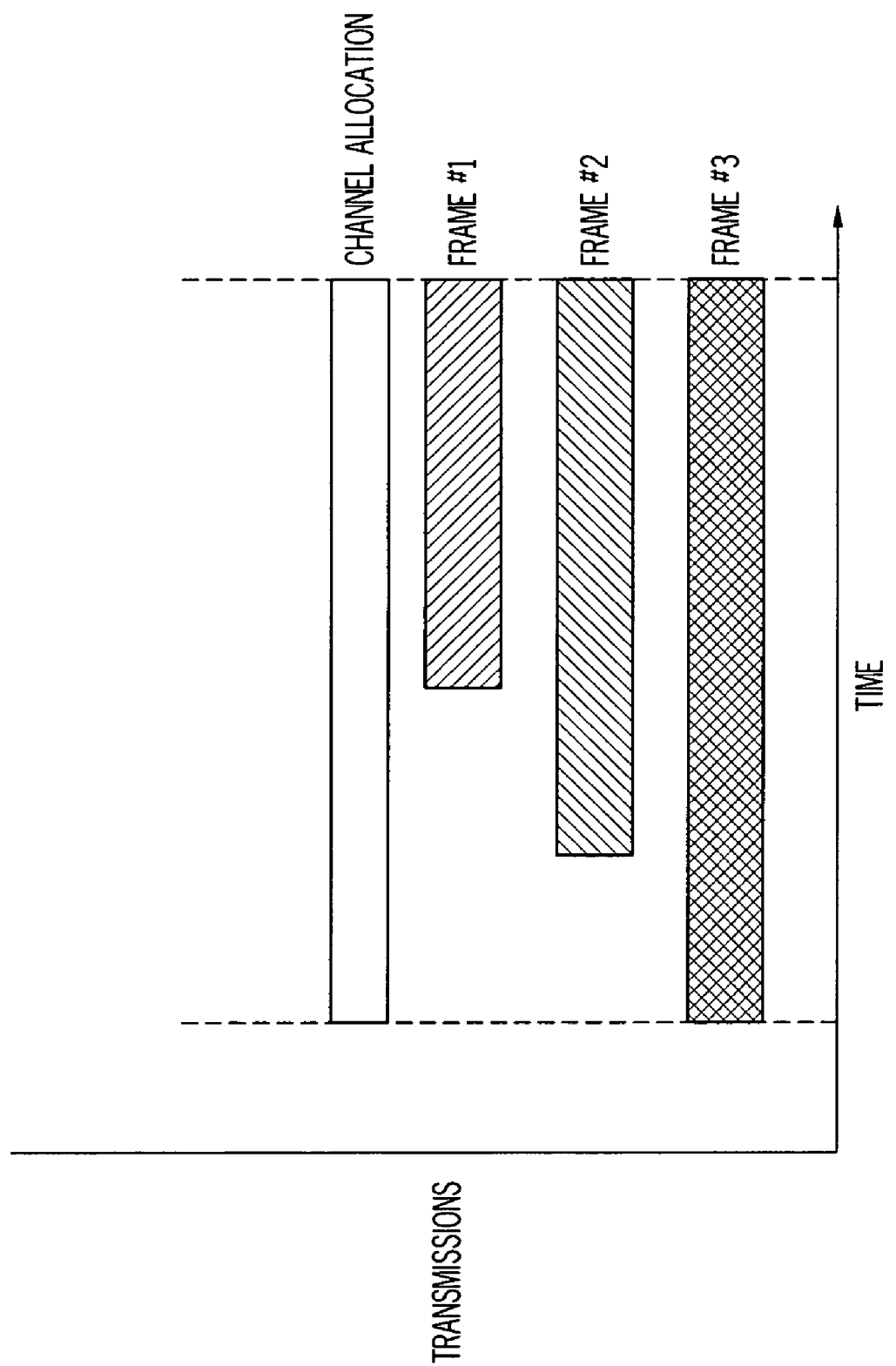
FIG. 4 is a graph that illustrates how synchronized frames are coordinated to all end transmission simultaneously and thereby avoid interference between the frames and acknowledgement signals from the mobile devices.

Although configuring the base station 16 to assert carrier sense and/or to transmit an RTS/CTS signal at appropriate times effectively prevents transmission collisions, the configurations alone do not fully exploit the system capacity. An exemplary base station is further configured to concurrently transmit to a plurality of sectors while avoiding transmission collisions. FIGS. 3 and 4 illustrate this embodiment, in which the base station 16 queues frames destined for mobile units 12a-12c using the previously-described directional antennas. Periodically, the base station 16 schedules concurrent transmissions of queued frames to the intended mobile units 12a-12c in their respective sectors. The concurrent transmissions are synchronized using a suitable reservation technique such as RTS/CTS signals, content free periods (CFP), or Hybrid Control Function Controlled Channel Access (HCCF). The synchronized transmissions are enabled by the base station 16 being configured to concurrently monitor and assess carrier sense in all the sectors throughout the communication area 10 as previously discussed.

Synchronizing the concurrent frame transmissions prevents interference from acknowledgments sent by the mobile units 12a-12e to the base station 16 after the mobile units 12a-12e receive the frame transmissions. If frames of different length begin their transmissions at the same time, the mobile unit that receives the smallest frame will send an acknowledgement signal that potentially interferes with the base station transmission of longer frames. The graph in FIG. 4 illustrates a way to overcome acknowledgement signal interferences with frame transmissions from the base station 16. Instead of beginning the synchronized frame transmissions simultaneously, the base station 16 is configured to end the synchronized transmissions simultaneously and thereby assure that all the frame transmissions are completed before any of the mobile units 12a-12e transmit an acknowledgement signal. It is likely that the mobile units 12a-12e will transmit acknowledgement signals simultaneously, but such signals will still be received without interference due to the directivity of the base station antennas.

The exemplary wireless network configurations in the foregoing description enables the use of a single basic service set identifier (BSSID) with multiple directional antennas that function as virtual access points in a communication area having a sectorized architecture. The directional antennas collocate transmissions between mobile units and a base station, and thereby increase the communication area size and the system capacity. The 802.11 network base station shares carrier sense information for each sector to prevent transmission collisions, and queues transmission frames to increase the system capacity without compromising performance and without creating a need to increase mobile unit power.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A wireless network device comprising:
  a plurality of directional antennas, each directional antenna adapted to transmit and receive data frames and configured to operate in a different direction, forming spatial sectors; and
  a network controller coupled to each of the plurality of directional antennas and adapted to transmit at least two data frames substantially simultaneously using at least two of the directional antennas, the network controller adapted to synchronize transmissions of the at least two data frames such that the ends of the transmissions occur substantially simultaneously, the network controller further adapted to detect wireless transmissions using each of the directional antennas and to delay transmission of at least one data frame through at least one of the directional antennas in response to detection of a wireless transmission.

2. The wireless network device of claim 1, wherein the network controller is adapted to transmit the at least one data frame such that the end of the at least one data frame is synchronized with the end of a non-delayed data frame.

3. The wireless network device of claim 2, wherein the delayed data frame and non-delayed data frame are different lengths.

4. A wireless network device comprising:
  a plurality of directional antennas, each directional antenna adapted to transmit and receive data frames and configured to operate in a different direction, forming spatial sectors; and
  a network controller coupled to each of the plurality of directional antennas and adapted to transmit at least two data frames substantially simultaneously using at least two of the directional antennas, the network controller adapted to synchronize transmissions of the at least two data frames such that the ends of the transmissions occur substantially simultaneously, the network controller further adapted to detect wireless transmissions using each of the directional antennas and to assert carrier sense in at least one spatial sector with at least one of the plurality of directional antennas in response to detecting a signal with a different directional antenna.

5. A wireless network device comprising:
  a plurality of directional antennas, each directional antenna adapted to transmit and receive data frames and configured to operate in a different direction, forming spatial sectors; and
  a network controller coupled to each of the plurality of directional antennas and adapted to transmit at least two data frames substantially simultaneously using at least two of the directional antennas, the network controller adapted to synchronize transmissions of the at least two data frames such that the ends of the transmissions occur substantially simultaneously, wherein each of the at least two data frames has a different length.

6. A method of communicating with wireless devices comprising:
  transmitting a first data frame in a first spatial sector using a first directional antenna; and
  transmitting a second data frame in a second spatial sector using a second directional antenna, the transmission of the first and second data frames being synchronized to end substantially simultaneously, wherein the first and second directional antennas are controlled by a network controller.

7. A method of communicating with wireless devices comprising:
  transmitting a first data frame in a first spatial sector using a first directional antenna; and
  transmitting a second data frame in a second spatial sector using a second directional antenna, the transmission of the first and second data frames being synchronized to end substantially simultaneously, wherein transmitting the first data frame comprises beginning transmission at a first time, and transmitting the second data frame comprises beginning transmission at a second time, the first and second times not being substantially the same time.

8. A method of communicating with wireless devices comprising:
   transmitting a first data frame in a first spatial sector using a first directional antenna;
   transmitting a second data frame in a second spatial sector using a second directional antenna, the transmission of the first and second data frames being synchronized to end substantially simultaneously; and
   receiving a first wireless transmission with at least one of the first and second directional antennas before transmitting the first or second data frames.

9. The method of claim 8, further comprising queueing the first and second data frames for transmission until the end of receiving the first wireless transmission.

10. A method of inhibiting interference in a wireless network comprising:
    detecting a first wireless signal in a first spatial sector using a first directional antenna coupled to a network controller, the first wireless signal being received in a first period and wherein detecting a first wireless signal comprises receiving a data frame with the first directional antenna; and
    asserting carrier sense in a second spatial sector using a second directional antenna coupled to the network controller in response to detecting the first wireless signal.

11. A method of inhibiting interference in a wireless network comprising:
    detecting a first wireless signal in a first spatial sector using a first directional antenna coupled to a network controller, the first wireless signal being received in a first period; and
    asserting carrier sense in a second spatial sector using a second directional antenna coupled to the network controller in response to detecting the first wireless signal, wherein asserting carrier sense in a second spatial sector has a duration at least as long as the first period.

12. A method of inhibiting interference in a wireless network comprising:
    detecting a first wireless signal in a first spatial sector using a first directional antenna coupled to a network controller, the first wireless signal being received in a first period;
    asserting carrier sense in a second spatial sector using a second directional antenna coupled to the network controller in response to detecting the first wireless signal; and
    delaying transmission of a data frame in response to detecting the first wireless signal.

* * * * *